United States Patent Office 3,177,001
Patented Apr. 6, 1965

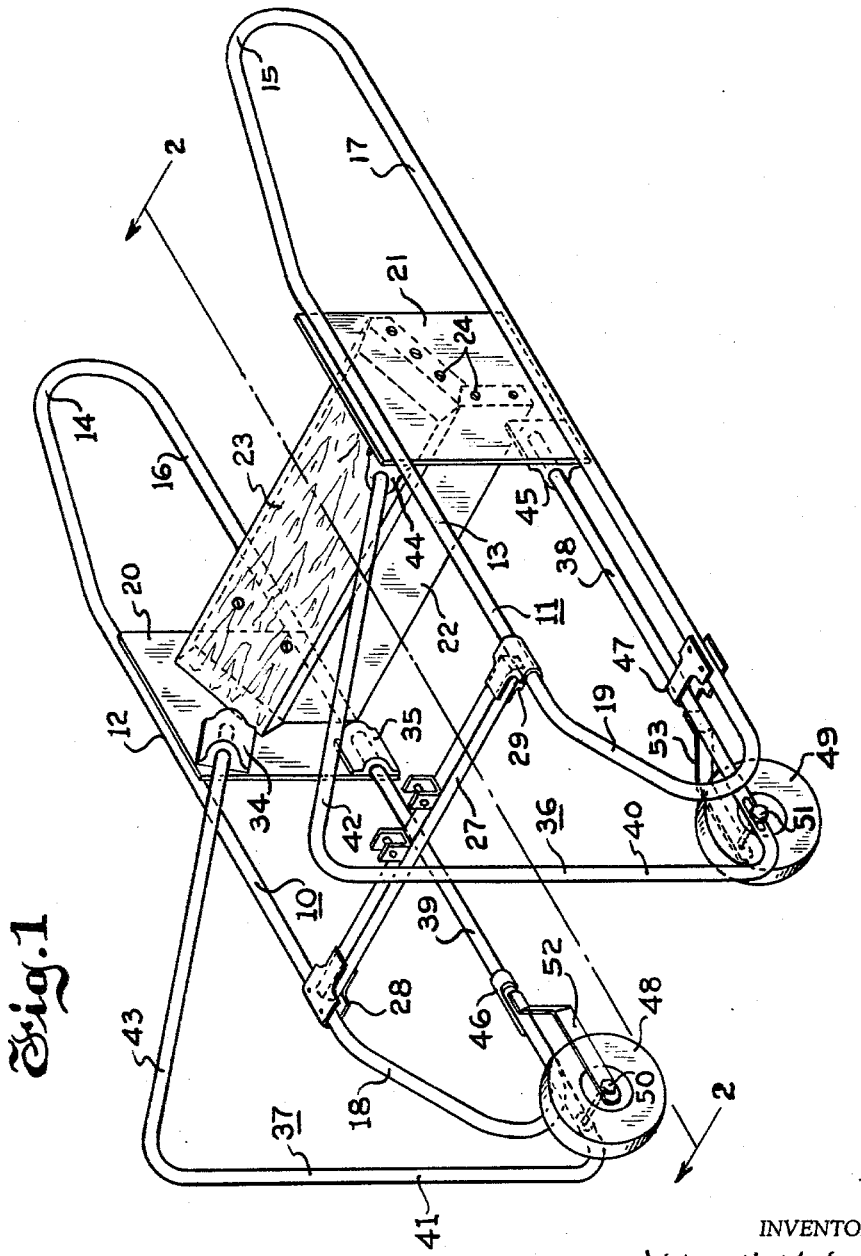

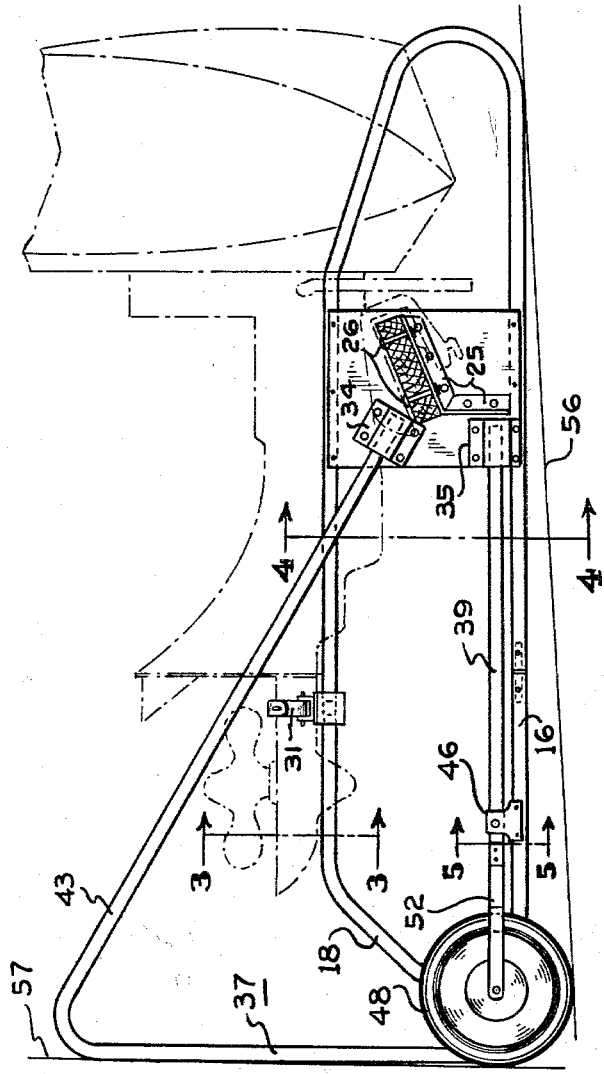
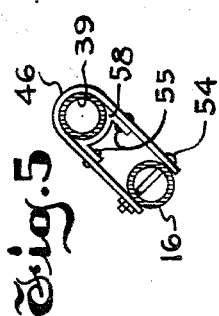

3,177,001
OUTBOARD MOTOR CARRIER TRUCK
William M. Wolford, 706 6th St. Terrace, Clinton, Mo.
Filed Apr. 12, 1963, Ser. No. 272,684
5 Claims. (Cl. 280—47.24)

This invention relates to article carriers generally and more particularly to outboard motor carriers specifically intended to facilitate the manual handling of outboard motors.

Outboard motors, because of their many parts and the coordinated functioning required, are heavy and cumbersome articles as well as complicated devices requiring careful handling to avoid damage. Many such motors are frequently transported by their owners from their homes to various bodies of water, requiring the handling of the motor at each end of the trip, along with its careful disposition to avoid damage during the trip. To preclude transportation damage, it is necessary to maintain a definite fixed position of the motor such that contact of the outwardly extending components of the motor which may be readily bent or broken is prevented. Various schemes for so doing have heretofore been employed, such as the use of ordinary hand trucks in loading and unloading the motor, and the use of an inflated automobile tire inner tube as a supporting cushion.

None of the prior art devices provide a light, simple and compact carrier enabling the easy and safe handling of outboard motors, which may be quickly adjusted for accommodating various sizes of motors and to which a motor may be readily releasably attached for transporting in a horizontal position, along with frictionally retained wheel members for converting to a two-wheel truck or handbarrow when loading and unloading. I have found that the problem of satisfactorily handling the unwieldly but delicate outboard motor mechanism can be substantially solved by means of the invention herein described.

This application is a continuation in part of my earlier filed pending application, Serial No. 131,834, filed August 16, 1961, now abandoned.

The principal object of my invention is the provision of a light, inexpensive, compact and sturdy knockdown type of carrier for facilitating the effective handling of outboard motors, and the construction and mode of operation will be readily understood from the following description taken in connection with the accompanying drawings, in which:

FIG. 1 is a perspective view of the carrier;
FIG. 2 is a sectional view of the carrier, taken along the line 2—2 of FIG. 1;
FIG. 3 is a fragmentary view of the forward transverse carrier member, from the line 3—3 of FIG. 2;
FIG. 4 is a view of the rear transverse carrier member, along the line 4—4 of FIG. 2; and
FIG. 5 is a fragmentary view of the frictional fastening means for attaching the wheel frame members to the cradle, along the line 5—5 of FIG. 2.

Referring first to FIG. 1, the reference characters 10 and 11 indicate a pair of transversely spaced, upstanding and elongated loops of tubular material, each loop as here shown being substantially trapezoidal in contour and positioned to define parallel vertical planes. Aluminum tubing of furniture grade is a desirable material from which to form the loops because of its relatively light weight. The loop 10 includes the longitudinally extending lower base portion 16, the vertically spaced longitudinally extending upper portion 12, and the extended handle portions 14 and 18. Similiarly, the loop 11 includes the base portion 17, the upper portion 13, and the handle portions 15 and 19.

A pair of opposed side plates 20 and 21 are rigidly secured, as by welding, to the respective upper and lower portions of the loops 10 and 11, and the rear motor carrier member including the transom block 23 and the transom support plate 22 extends transversely between the side plates 20 and 21, the transom support plate 22 being provided at its respective ends with a flange, as indicated at 25, for attachment to the side plates by means of the fasteners 24. The transom 23, as shown in FIG. 2, is secured to the transverse plate 22 by the bolts 26, and at a convenient angle for receiving the stern clamp of an outboard motor.

The forward transverse carrier member, shown in more detail at FIG. 3, includes the beam member 27, one end of which is loosely attached to the upper portion 13 of the loop 11 by means of a U-shaped attaching member 29, the latter being secured to the beam member 27 by the rivets 33. Similarly, the other end of the beam member is loosely attached to the upper portion 12 of the loop 10, by means of the member 28 and the rivets 32. Spaced apart on each side of the midpoint of the beam 27 are secured thereon, as by welding, the ears 30, to which the respective ends of the buckled strap 31 are fastened.

In use, the freely slidable forward carrier member is first moved to the desired position to accommodate the size of outboard motor to be handled. The motor, for example, that indicated by the dashed lines of FIG. 2, is disposed horizontally on the cradle with the stern bracket clamp fitted over the transom 23. The stern bracket clamp is then manipulated to rigidly secure the motor to the rear carrier member, and the strap 31 placed around the lower gear housing and buckled to secure the motor to the forward carrier member. The motor is then in condition for transport with the cradle, for example, in an automobile trunk compartment, the use of the handle portions of the cradle making the loading and unloading of the motor a relatively simple procedure.

The side plates 20 and 21 have secured thereto the lower sockets 35 and 45 and the upper sockets 34 and 44, all four sockets facing away from the rear carrier member. The lower sockets are positioned adjacent to the lower longitudinally extending portion 16 and 17 of the loops 10 and 11 respectively, and extend in substantial parallel relationship therewith, and the upper sockets are positioned adjacent the upper longitudinally extending portions 12 and 13 of the loops 10 and 11 and are directed divergently upward with respect to the direction of the lower sockets.

The detachable wheel mounting frame member 36, formed from resiliently bendable tubing, such as furniture grade aluminum, is arranged with the horizontal arm 38 in engagement with, but in no way fastened to, the socket 45, and the forwardly and upwardly sloping arm 42 is engaged with, but in no way fastened to, the socket 44. The arms of the wheel frame member are joined at their respective forward ends by the vertical portion 40, and the wheel 49 is journalled, for rotation about the axle 51, on the frame member 36 near the junction of the portions 38 and 40. Similarly, the detachable wheel mounting frame member 37 is arranged with the horizontal arm 39 in engagement with, but in no way fastened to, the socket 35, and the forwardly and upwardly sloping arm 43 is engaged with, but in no way fastened to, the socket 34, the arms being joined at their respective forward ends by the vertical portion 41, and the wheel 48 is journalled, for rotation about the axle 50, on the frame member 37 near the junction of the portions 39 and 41. The brackets 52 and 53 are provided for supporting the inner ends of the axles 50 and 51 respectively.

A U-shaped friction developing sleeve member 46, shown more in detail in FIG. 5, a rigidly secured to the lower longitudinally extending portion 16 of the loop 10, by means of the bolts 54 at a point between the wheel 48 and the socket 35, and between the arms of the U a curved plate 58 is fixed by the rivets 55, so that a circular opening is provided through which the horizontal portion 39 of the wheel frame member 37 passes freely in slip-fit engagement. In similar assembly, the U-shaped friction developing member 47, through which the horizontal portion 38 of the other wheel frame member passes freely in slip-fit engagement, is riveted to the loop 11.

It is noted that no fasteners of any kind are provided for attaching the wheel frame members to the cradle; the free ends of the frame members are simply slipped into the cooperating sockets after passing the lower arm of each member through the friction developing element. When so arranged, as shown in FIG. 1, and an outboard motor is mounted on the cradle portion as described above, the weight of the motor slightly deforms the frames 36 and 37 as the carrier is raised from its horizontal position, causing tight frictional engagement of the friction developing members 46 and 47, thus securely attaching the wheel frame members to the cradle. In this condition, the carrier has two self-supporting stable positions, as indicated in FIG. 2 where it is shown (a) resting on a surface indicated by the numeral 56 and (b) resting on a surface indicated by the numeral 57.

By raising the rear end of the carrier, as by lifting upon the handle portions 14 and 15, the carrier can be moved either forward or backward without any tendency toward detachment of the wheel frame members from the cradle, and when the motor is removed from the cradle, the wheel frame members are readily slipped out of their associated sockets, again without the necessity of unfastening of any fasteners of any kind.

While I have shown and described a specific embodiment of my invention, other modifications are possible within the spirit of the invention, and I intend in the appended claims to cover all modifications within the scope of my invention.

I claim, as my invention:

1. An outboard motor carrier comprising a cradle and a pair of detachable wheel members, said cradle including
   a pair of laterally spaced, upstanding and elongated loops of tubular material and transversely extending forward and rear motor carrier members joining said loops and adapted to receive thereon an outboard motor,
   each of said loops having upper and lower portions extending longitudinally in spaced parallel relationship and forward and rear portions joining said upper and lower portions,
   a socket-supporting member joining the upper and lower longitudinally extending portions of each of said loops between the respective ends thereof,
   a pair of vertically spaced upper and lower sockets rigidly secured to each of said socket-supporting members, each socket having an open end and a closed end and each socket disposed with its open end facing away from said rear carrier member,
   the lower socket of each pair being positioned adjacent to the lower longitudinally extending portion of each of said loops with its longitudinal axis extending in parallel relationship therewith and
   the upper socket of each pair being positioned adjacent to the upper longitudinally extending portion of each of said loops with its longitudinal axis extending upwardly and divergently with respect to the longitudinal axes of the lower sockets,
   said wheel members each including
   a frame of resiliently bendable tubular material adapted to fit into said sockets and having an upwardly extending base portion positioned forwardly beyond the forward and portions of said loops and arms extending from the respective upper and lower ends thereof,
   said arms extending convergently with respect to one another and coaxially with respect to said upper and lower sockets for slidable movement into and out of said sockets,
   a wheel attached to and journalled adjacent to the base portion on each of the arms which is engageable with a lower socket,
   said wheels having portions thereof extending below and forwardly beyond both the forward end portions of said loops and the lower ends of said base portions,
   a friction-developing member rigidly secured to each lower portion of said loops at a point between the wheel attachment and the lower socket of each pair, each of said friction-developing members having an opening extending therethrough in coaxial relationship with one of said pair of lower sockets, the arms of each of said wheel members which engage associated lower sockets being freely slidable through said friction-developing members and into said lower sockets in slip-fit engagement therewith in the absence of bending stress imposed on said last-named arms, and frictionally engaging said friction-developing members to maintain attachment of said wheel members to said cradle in response to bending stress imposed on said last-named arms.

2. The construction set forth in claim 1, in which each of said upstanding loops is trapeziodal in contour.

3. The construction set forth in claim 1, in which the forward carrier member is slidably mounted on the upper longitudinally extending portions of said loops.

4. The construction set forth in claim 1, in which handle portions for manipulating the carrier are included in and provided by the rearward extension of each loop beyond the rear carrier member.

5. The construction set forth in claim 4, whereby there is provided two stable positions of the carrier, of which the first is established by spaced points of support provided by the wheels and the rearward end portions of the cradle and the second by spaced points of support provided by the wheels and the upper ends of the base portions of the frames.

References Cited by the Examiner

UNITED STATES PATENTS

| | | |
|---|---|---|
| 1,747,600 | 2/30 | Reardon. |
| 2,575,749 | 11/51 | Cross. |
| 2,595,484 | 5/52 | Ritchey. |
| 2,686,028 | 8/54 | Johnson _____ 248—13 |
| 2,745,673 | 5/56 | Koepke et al. |
| 2,817,436 | 12/57 | Simpson. |
| 2,843,393 | 7/58 | Dahlander. |
| 2,966,319 | 12/60 | Todish. |

A. HARRY LEVY, *Primary Examiner.*